(12) United States Patent
Nuñez Di Croce

(10) Patent No.: US 10,452,851 B2
(45) Date of Patent: *Oct. 22, 2019

(54) AUTOMATED SECURITY ASSESSMENT OF BUSINESS-CRITICAL SYSTEMS AND APPLICATIONS

(71) Applicant: Onapsis S.R.L., Ciudad de Buenos Aires (AR)

(72) Inventor: Mariano Nuñez Di Croce, Ciudad de Buenos Aires (AR)

(73) Assignee: ONAPSIS S.R.L., Ciudad de Buenos Aires (AR)

( * ) Notice: Subject to any disclaimer, the term of this patent is extended or adjusted under 35 U.S.C. 154(b) by 0 days.

This patent is subject to a terminal disclaimer.

(21) Appl. No.: 15/015,511

(22) Filed: Feb. 4, 2016

(65) Prior Publication Data

US 2016/0154962 A1     Jun. 2, 2016

Related U.S. Application Data

(62) Division of application No. 14/631,147, filed on Feb. 25, 2015, now abandoned, which is a division of application No. 13/807,122, filed as application No. PCT/IB2011/052918 on Jul. 1, 2011, now Pat. No. 9,009,837.

(60) Provisional application No. 61/360,610, filed on Jul. 1, 2010.

(51) Int. Cl.
*G06F 21/57* (2013.01)
*G06F 16/951* (2019.01)
*H04L 29/06* (2006.01)

(52) U.S. Cl.
CPC .......... *G06F 21/577* (2013.01); *G06F 16/951* (2019.01); *H04L 63/1433* (2013.01); *G06F 2221/033* (2013.01)

(58) Field of Classification Search
CPC ............ H04L 63/1433; H04L 63/1416; H04L 67/025; G06F 21/577; G06F 21/554
USPC ........................... 726/4, 22, 23, 25; 709/223
See application file for complete search history.

(56) References Cited

U.S. PATENT DOCUMENTS

| | | | | |
|---|---|---|---|---|
| 7,574,740 B1 * | 8/2009 | Kennis | ............... | H04L 63/1416 713/151 |
| 7,845,007 B1 * | 11/2010 | Kennis | ............... | H04L 63/1433 709/224 |
| 8,626,904 B1 * | 1/2014 | Olliff | ..................... | G06F 9/524 709/224 |

(Continued)

FOREIGN PATENT DOCUMENTS

WO        03060717 A1     7/2003

OTHER PUBLICATIONS

SAP SE; SAP Solution Brief; Protect Your Connected Business Systems by Identifying and Analyzing Threats; 2014.

(Continued)

*Primary Examiner* — Hosuk Song
*Assistant Examiner* — Sayed Aresh Beheshti Shirazi
(74) *Attorney, Agent, or Firm* — Peter Nieves; Sheehan Phinney Bass & Green PA

(57) ABSTRACT

Systems and methods which provide a new application security assessment framework that allows auditing and testing systems to automatically perform security and compliance audits, detect technical security vulnerabilities, and illustrate the associated security risks affecting business-critical applications.

8 Claims, 6 Drawing Sheets

(56) References Cited

U.S. PATENT DOCUMENTS

| | | | |
|---|---|---|---|
| 8,955,115 B2* | 2/2015 | Sabetta | G06F 21/57 726/22 |
| 2003/0212779 A1* | 11/2003 | Boyter | H04L 41/22 709/223 |
| 2003/0212910 A1* | 11/2003 | Rowland | G06F 21/554 726/22 |
| 2003/0217039 A1* | 11/2003 | Kurtz | G02B 5/3083 |
| 2005/0005169 A1* | 1/2005 | Kelekar | H04L 63/1408 726/4 |
| 2006/0048214 A1* | 3/2006 | Pennington | H04L 63/10 726/5 |
| 2006/0137012 A1* | 6/2006 | Aaron | G06F 21/564 726/24 |
| 2006/0156408 A1* | 7/2006 | Himberger | G06F 21/552 726/25 |
| 2007/0016955 A1* | 1/2007 | Goldberg | G06Q 40/08 726/25 |
| 2007/0157195 A1* | 7/2007 | Gaa-Frost | G06F 8/60 717/174 |
| 2008/0092237 A1* | 4/2008 | Yoon | G06F 21/577 726/25 |
| 2008/0266638 A1 | 10/2008 | Russ et al. | |
| 2009/0150570 A1* | 6/2009 | Tao | H04L 67/06 709/249 |
| 2009/0259748 A1* | 10/2009 | McClure | G02B 6/105 709/224 |
| 2010/0106771 A1* | 4/2010 | Park | H04L 63/0846 709/203 |
| 2010/0325620 A1* | 12/2010 | Rohde | G06F 9/44589 717/154 |
| 2010/0332373 A1* | 12/2010 | Crabtree | G06Q 40/04 705/37 |

OTHER PUBLICATIONS

SAP SE; SAP Enterprise Threat Detection presentation; Oct. 15, 2014.

Martin Plummer; Safeguard Your Business—Critical Data with Real-Time Detection and Analysis; SAPInsider Oct.-Dec. 2014 issue.

D. Stox, "Security Optimization Self Service—A Real-life Example", SAP Community Network, SAP AG 2009.

F. Bucholz and F Bauspiess, "SIM100 SAP Security Services Overview", SAP Teched 09, Oct. 2009.

International Searching Authority, International Search Report and Written Opinion, Application No. PCT/IB2011/052918, dated Jul. 2011.

The International Bureau of WIPO, International Preliminary Report on Patentability:, for International Application No. PCT/IB2011/052918, dated Jan. 2013

European Patent Office, "Third Party Observation for application No. WO2011/IB52918", Feb. 2013.

CYBSEC Security Systems, Information Security Solutions, Download Sapyto, 2008, online: ,http://www.cybsec.com/otd/otd_form.php?lang-en&form-sapyto>.

CYBSEC Security Systems, Information Security Solutions, "Sapyto—SAP Penetration Testing Framework", 2009, online: ,http:www.cybsec.com/en/research/sapyto/php>.

Darknet, "Onapsis Bizploit—ERP Penetration Testing Framework", Jun. 2010, online: <http://www.darknet.org.uk/2010/06/onapsis-bizploit-erp-penetration-testing-framework/>.

Darknet, "Sapyto v0.98 Released—SAP Penetration Testing Framework Tool", Dec. 2008, online: ,http://www.darknet.org.uk/2008/12/sapyto-v098-released-sap-penetration-testing-framework-tool/>.

Hack in the Box Security Conference 2010, "2-Dat Deep Knowledge Security Conference", Apr. 2010, online: <http://conference.hitb.org/hitbsecconf2010dxb.

Hack in the Box Security Conference 2010, "Mariano Nunez Di Croce", Conference Materials, Apr. 2010, Online: <http://conference.hitb.org/hitbsecconf2010dxb/index.html%3Fpage_id=787.html>.

HITBSecNews, "Bizploit—The Opensource ERP Penetration Testing Framework has been released", May 2010, online: <http://news.hitb.org/content/bizploit-opensource-erp-penetration-testing-framework-has-been-released>.

SecurityFocus, "Onapsis Research Labs: Onapsis Bizploit—The opensource ERP Penetration Testing Framework", Jun. 2010, online: <http:www.securityfocus.com/archive/1/511589/30/6810/threaded>.

* cited by examiner

Quick Information

| Risk | Name |
|---|---|
| ⓘ MEDIUM | Anonymous RFC calls are enabled |

Description

It is possible to call some RFC function modules anonymously. These special function modules belong to the SRFC function group, which by default allows unauthenticated calls. This situation allows a malicious party to perform different kind of attacks over the target system, such as obtaining sensitive information about the technical infrastructure deployed.

Solution

It is recommended to prohibit anonymous calls to the SAP Application Server. In order to do so, the profile value of parameter "auth/rfc_authority_check" should be set to 9.

Notification messages

| Instance | Started | | Finished | | Status |
|---|---|---|---|---|---|
| 192.168.0.163 | 2010-06-28 | 16:51:27 | 2010-06-28 | 16:51:27 | Finished✓ |
| 192.168.0.161 | 2010-06-28 | 16:51:30 | 2010-06-28 | 16:51:30 | Finished✓ |
| 192.168.0.163 | 2010-06-28 | 16:51:33 | 2010-06-28 | 16:51:33 | Finished✓ |
| 192.168.0.163 | 2010-06-28 | 16:51:36 | 2010-06-28 | 16:51:47 | Finished✓ |

| Session Progress | Core Log | Modules Log | Warning | Debug |

(FROM FIG. 4B)

☐ Onapsis X1-The ERP...    ♡○ ⌨ 17:15

FIG. 4C

AUTOMATED SECURITY ASSESSMENT OF BUSINESS-CRITICAL SYSTEMS AND APPLICATIONS

CROSS-REFERENCE TO RELATED APPLICATIONS

This application is a divisional of and claims the benefit of U.S. patent application Ser. No. 14/631,147 filed on Feb. 25, 2015, which is a divisional application of U.S. patent application Ser. No. 13/807,122, filed Mar. 11, 2013 (now U.S. Pat. No. 9,009,837), which is a national stage application of PCT/IB2011/052918, filed Jul. 1, 2011, which is a non-provisional application of and claims priority to U.S. Provisional Application 61/360,610, filed Jul. 1, 2010, all of which are incorporated by reference herein in their entirety.

TECHNICAL FIELD

The present invention is generally related to computer system security and, in particular, to the automated security assessment of business-critical applications and systems.

BACKGROUND OF THE INVENTION

Nowadays, most medium and large enterprises in the world rely on information systems to manage their key business processes. Examples of this type of systems are solutions for Enterprise Resource Planning (ERP), Customer Relationship Management (CRM), Supplier Relationship Management (SRM), Supply Chain Management (SCM), Product Life-cycle Management (PLM), Human Capital Management (HCM), Business Intelligence (BI), Integration Platforms, etc. Industry-recognized software products in this area involve SAP NetWeaver-based solutions and the SAP R/3 platform, Oracle E-Business Suite, JD Edwards Enterprise One, PeopleSoft, Siebel and Microsoft Dynamics. These products are used in most of the Fortune-100 and large governmental organizations in the world. SAP alone, has more than 90,000 customers in more than 120 countries.

These systems are in charge of processing sensitive business information and managing key processes across the organization, such as procurement, billing, invoicing, financial planning, production, payroll management, etc. The confidentiality, integrity and availability of this information are therefore critical for the security and continuity of the business.

For this document, the architecture of this kind of business-critical systems can be represented as in FIG. 1.

So far, most of the existing solutions for evaluating the security of these systems are designed to work on two layers: the functional layer [21] and the base layer. In the functional layer [21], solutions are designed to check mainly for Segregation of Duties violations. Solutions of this kind contain a comprehensive matrix of incompatible business functions and their mappings to the systems' related technical authorizations. On the other side, solutions working at the base layer mainly involve checking for security vulnerabilities in the base Operating System [24] and Database [23] layers of the systems.

While this kind of security assessment is of absolute importance, it has been noted that the security and auditing industry has so far been overlooking a major source of risk: the security of the technological components of these systems [22]. Each of these applications are developed using complex proprietary (as well as open) runtime platforms, specific protocols and security architectures. Due to the high complexity involved in proper security evaluation and assessment of this layer, added to the lack of consistent public information on the subject, its security is usually disregarded in the implementation phase and is neither comprehended in later security audits to the systems.

It is important to note that, despite being commonly disregarded, many of the threats in this layer have higher levels of risk than those in the functional layer [21], because of the following reasons:

The cyber attacker does not need to have a user account in the target system, which increases the like-hood of attacks.

As many cyber attacks can be performed remotely and anonymously, tracing the attacker back to his source location can be far more complicated than detecting local attackers.

In order to perform attacks at the functional layer [21], a high level of knowledge about internal business processes and controls is usually required. Attacks to the technological layer [22] can be performed automatically, even using public exploits available in the Internet.

According to the practical experience of consultants engaged in specialized security assessments for world-wide customers, more than 95% of the evaluated systems were susceptible to sabotage, espionage and fraud attacks due to information security risks in their technological components. Surprisingly, many of those systems had passed regulatory compliance audits in the past.

It is also important to note that the relevance of this subject has grown radically over the last years. This is clearly reflected in the growth of related presentations in international security conferences and the increased number of technical security vulnerabilities being disclosed. It should be noted that the number of SAP security notes released each year has experienced a rapid growth in the last years, increasing more than 3800%, when comparing 2010 to 2007.

Performing this kind of comprehensive assessment through a manual approach is not feasible from a cost perspective, as common implementations of these systems can feature several dozen up to hundreds of Application Servers, each one comprising several security aspects to be reviewed.

At the same time, there are some solutions which try to automate some of these checks, such as the SAP Security Optimization Self-Service application, but they present several caveats that make it impractical for use as a security solution for professional security assessments and audits, such as:

It must be run from within an SAP system, meaning that the system used for evaluation could be the same as the one being evaluated. This is contrary to basic audit principles, which states that the auditing and the audited systems must be different in order to ensure the integrity of the audit results.

Related with the prior point, the fact that the assessments are executed from within an SAP system, forces the user to have explicit SAP operation knowledge to successfully use the system.

Reduced customization possibilities. The user cannot perform fine-grained configurations of the checks to execute and their configuration, and thus cannot check the system against different external or internal policies.

Low number of audit checks. Most of the checks are related with Segregation of Duties controls and the review of critical technical authorizations assigned to users. Many security settings are thus not evaluated automatically by the application, leaving an open gap for potential cyber attacks.

Lack of support for SAP Java platforms. The application can only perform checks for SAP ABAP platforms.

No blind discovery capabilities. The application can only evaluate systems manually configured by the user. This becomes highly impractical in large environments with hundreds or thousands of systems.

No black-box vulnerability assessment capabilities. The application only performs white-box security reviews.

No risk illustration. The application does not support the execution of risk illustration activities in order to demonstrate the real risk of detected security issues.

Other existing automated security software do not currently present reliable and advanced features to identify security risks affecting business-critical applications with a holistic approach (combining white-box reviews, black-box assessment and risk illustration activities), which results in a lack of detection of existing risks and generates a false sense of security for the organizations relying on them.

In view of the shortcomings discussed above, there is a need for systems and methods for performing automated security assessments of business-critical systems that takes an entirely fresh approach and overcomes the drawbacks of the conventional techniques.

SUMMARY OF INVENTION

The present invention provides systems and methods which have a new application security assessment framework which allows auditing and testing systems to automatically perform security and compliance audits, detect technical security vulnerabilities and illustrate the associated security risks affecting business-critical applications. Examples of such business-critical applications are Enterprise Resource Planning (ERP), Customer Relationship Management (CRM), Supplier Relationship Management (SRM), Supply Chain Management (SCM), Product Lifecycle Management (PLM), Human Capital Management (HCM), Integration Platforms, Business Warehouse (BW)/Business Intelligence (BI) and Integration applications developed by SAP, Oracle, Microsoft, Siebel, JD Edwards and PeopleSoft.

It is an object of the present invention to decrease business frauds risks derived from information security breaches, enforce compliance requirements and decrease audit costs for organizations using these business-critical applications.

The present invention overcomes the inefficiencies of the prior art by offering a program that can be executed from a computer system and remotely perform security assessment of the technological components of business-critical applications using different approaches and, therefore, providing a holistic knowledge of the current security level of the target systems.

These and other objectives are accomplished by providing a component that enables the automated discovery, identification and organization of business-critical systems in a specified computer network.

Furthermore, the present invention provides a method for executing security assessment modules through a method that ensures that modules are executed according to a specified scope and thus generating consistent and non-redundant results.

These and other objectives are also achieved by providing several specialized modules that evaluate the specific information security risks affecting the technological components of SAP software programs.

In a first aspect, the present invention provides a system for automatically testing at least one target computer system for security vulnerabilities, the system comprising:
 a core engine subsystem for storing data related to said security vulnerabilities and configurations for at least one target computer system or network of computer systems;
 at least one scan engine subsystem in communication with said core engine subsystem, said scan engine subsystem comprising:
  a system identifier subcomponent for determining resources of said at least one target computer system;
  a plurality of testing and probing modules for automatically testing resources of said at least one target computer system and for determining a vulnerability of said resources;
  an intelligent dispatch subcomponent for launching at least one of said testing and probing modules based on a configuration of said module;
 wherein said at least one target computer system executes business-critical applications.

In another aspect, the present invention provides a method for determining security vulnerabilities of computer networks or computer systems, the method comprising:
 a) determining addresses for at least one target whose security vulnerabilities are to be determined, said at least one target comprising at least one of computer networks, computer systems, and computer systems on said computer networks;
 b) determining addresses of resources associated with said at least one target;
 c) determining characteristics of said resources;
 d) selecting at least one testing or probing module for each resource based on characteristics determined in step c);
 e) executing said at least one testing or probing module selected in step d), said at least one testing or probing module for each resource being configured according to said characteristics of said resource for which said at least one testing or probing module has been selected;
 f) receiving data from said at least one testing or probing module executed in step e);
 g) determining security vulnerabilities of said at least one target based on said data received in step f).

Another aspect of the invention provides a system for automatically determining security vulnerabilities of computer networks or computer systems, the system comprising:
 a core engine subsystem for storing data related to said security vulnerabilities and configurations for at least one target computer system or network of computer systems
 a scan engine subsystem in communication with said core engine subsystem, said scan engine subsystem comprising:
  a system identifier module for discovering and identifying said at least one target computer system or network and relevant resources of said at least one target computer system or network
  an intelligent dispatch module for launching at least one testing or probing module based on a characteristic of at least one relevant resource discovered and identified by said system identifier module at least one testing and probing module for automatically testing said at least one relevant resource and for determining a vulnerability of said at least one relevant resource wherein said at least one testing and probing module is controlled by said intelligent dispatch module and wherein security configurations for said target is stored in a database and said modules are executed on said data in said database.

A further aspect of the invention provides a method for assessing a security configuration of a target computer system, the method comprising:
a) scanning previously provided IP addresses and ports;
b) fingerprinting detected open ports to identify underlying services for said open ports
c) detecting if said target system is active;
d) accessing a database of modules and executing at least one of said modules, said modules being for determining security vulnerabilities accessible through said IP addresses and ports;
wherein
said at least one module is executed based on a configuration of said module;
said target computer system is for executing business-critical applications.

BRIEF DESCRIPTION OF THE DRAWINGS

The features and advantages will become more apparent from a detailed consideration of the invention when taken in conjunction with the drawings in which:

FIGS. 4A, 4B, and 4C are screenshots illustrating information from a security sweep session according to another aspect of the invention.

DETAILED DESCRIPTION OF THE INVENTION

Figure 1:
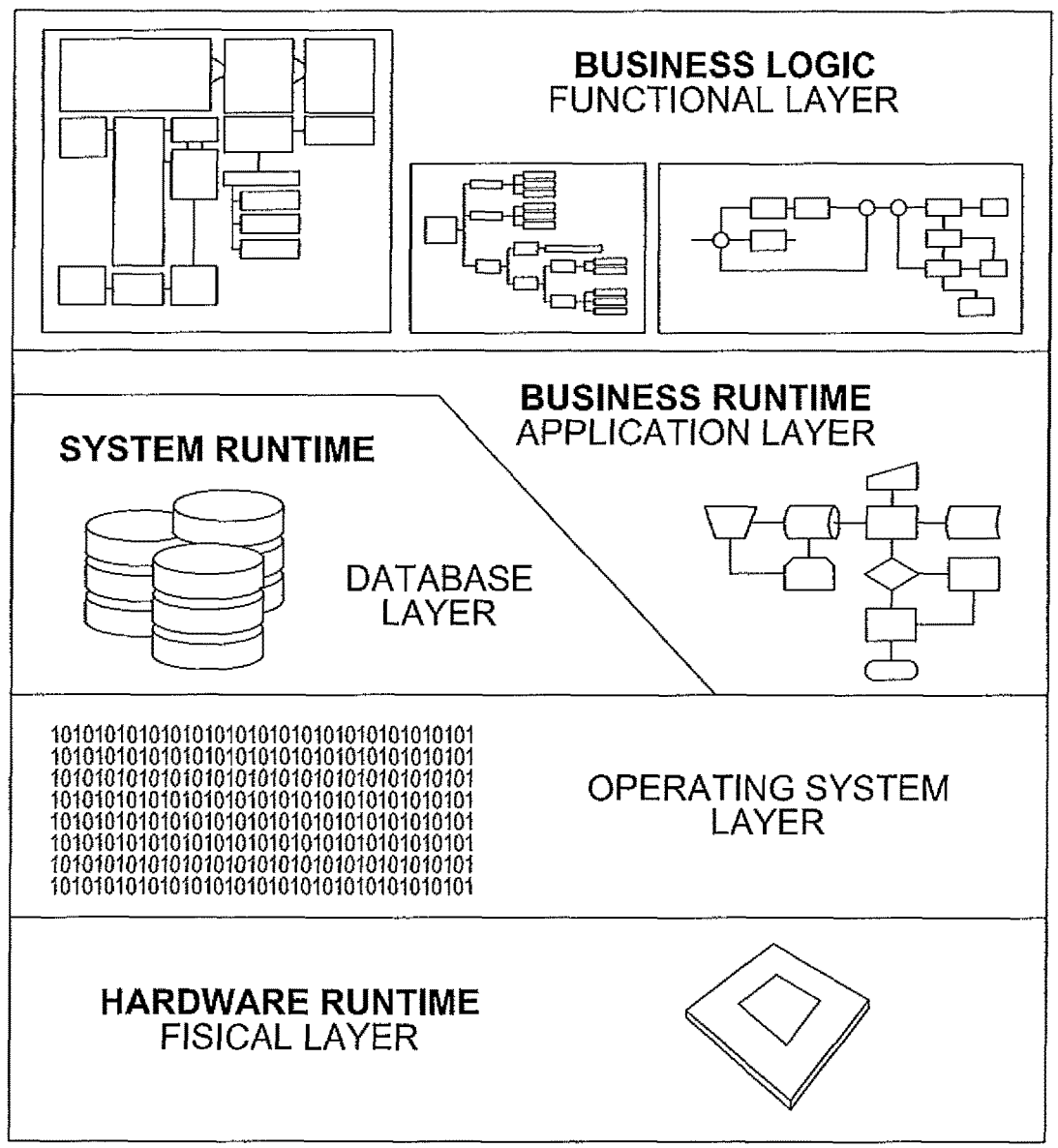
FIG. 1 is a block diagram of an architecture for business-critical systems on which the present invention may be practiced.

The present system and method provides an application security assessment framework to automatically perform security and compliance audits, detect technical security vulnerabilities and illustrate the associated risks affecting business-critical applications. Examples of business-critical applications are ERP, CRM, HCM, SRM, SCM, front-end systems and Integration Platforms developed by SAP, Oracle, Microsoft, Siebel, JD Edwards and PeopleSoft.

The present invention is comprised of 4 basic logical components: a user interface, a core engine, a scan engine and modules. In general, and as elaborated in more detail below, the user will interact through the user interface to configure the target systems that will be evaluated, select the modules he wants to execute, start or schedule the assessment session, and obtain a report detailing discovered security risks. It should, however, be noted that a user interface is not necessary for the invention to properly operate. Its other components can be configured to operate automatically and autonomously of a user.

One preferred embodiment of this invention is a software program that is run in a Microsoft Windows, UNIX/Linux or Mac OSX operating system. Users access this program through different types of interfaces, such as Web-based or desktop technologies. The program connects to target systems remotely and performs the requested assessment activities. Results from the evaluation are stored centrally in the program's server database.

In another embodiment of the present invention, the target system's related security information has been extracted and stored in a database. The requested assessment activities are performed against that database repository.

In another embodiment of the present invention, only the user interface and the core engine of the program are run in a centralized server, while the scan engine and modules are executed in the target computer's operating system. The core engine instructs the scan engine which activities must be performed in the target system. The scan engine executes the required modules locally and sends the results back to the core engine, where they are stored and later processed by its sub-components.

In another embodiment of the present invention, the user interface and the core engine of the program are run in a centralized server, while the scan engine and modules are executed in an intermediate server. The core engine instructs the scan engine which activities must be performed in the target system. The scan engine executes the required modules remotely and sends the results back to the core engine, where they are stored and later processed by its sub-components.

While the present description outlines the architecture based on these 4 basic components, it is important to understand that other embodiments of this invention can group or further divide the activities of each component into a different set/combination of components.

Architecture

As described above, the present invention is preferably organized into 4 basic components, a user interface, a core engine, a scan engine and modules. These components have, in turn, a set of sub-components in charge of performing specific tasks in the application. These are presented in FIG. 2 and detailed in respective sections below.

In order to understand the following sections, it is useful to understand the entities that are involved in the process:

Landscape/Asset Group: An arbitrary group of Systems/Assets and/or Components and are identified by a name defined by the user.

System/Asset: Group of Components. These represent a system of a business-critical environment and are identified by a name.

Component: Group of Connectors. These represent a specific component of a System/Asset, such as an application server or a database server, etc. These are identified by a name and component-specific properties.

Connector: An interface to a specific service of a Component. Connectors are created automatically through discovery techniques or are created manually by user. Connectors are identified by connector-specific properties.

User Interface

The User Interface [01] allows users to communicate with the application. This interaction mainly consists of selecting and configuring the targets, selecting which modules to run, starting or scheduling the session, and viewing and saving generated reports. The user can also choose to run special sessions configured through special Wizards [08] (Discovery and exploration, Audit & Compliance, Vulnerability Assessment, BizRisk Illustration), which automate and simplify many of the configuration activities to help non-advanced users in using the invention.

Figure 3:
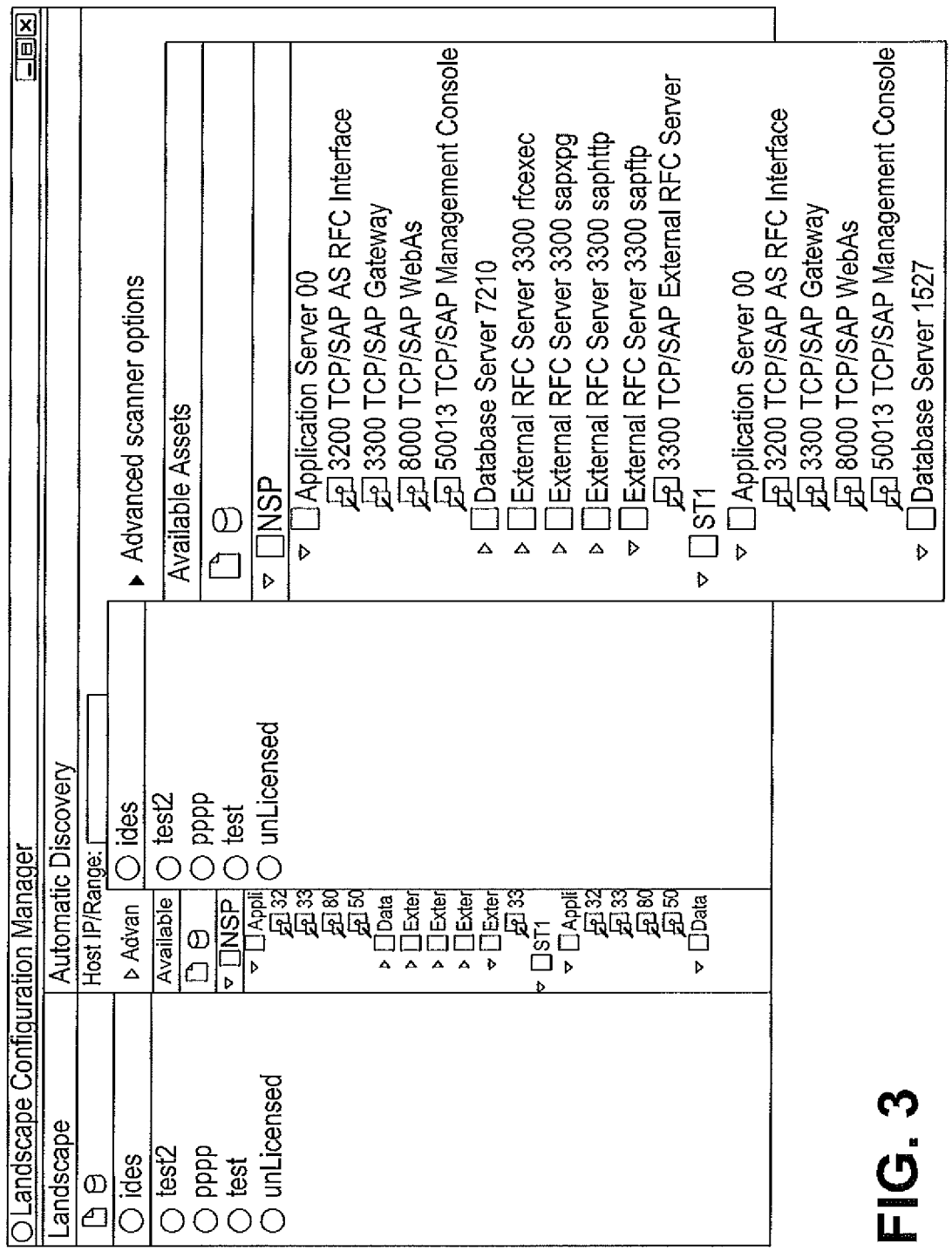
FIG. 3 is a screenshot of one user interface used with one aspect of the invention.

Target configuration is performed through the Landscape Manager [20] (See FIG. 3). Through this sub-component, the user can choose to configure each target manually or the user can choose to perform an automatic discovery of the existing systems in a provided IP address range. This automatic discovery is performed by the System Identifier sub-component [09] of the Scan Engine [02]. This sub-component is described in a separate section below. Landscape Configurations are stored in the Configuration Repository [15] sub-component.

Should the user need to configure a special selection and configuration of modules, to re-use them for future (and possibly repetitive) sessions, he will do so by interacting with the Policy Manager [06] sub-component. Through this sub-component, the user is presented with all the available modules/module categories. The user can select and configure module options and then save this configuration into a Policy, identified uniquely by a name.

The user interface can be implemented through different technologies in order to provide support for different kind of needs. For example, a desktop graphical user interface is best suited to provide access to single user installations. In another embodiment, a Web-based interface is used to provide access to multi-user, centralized implementations in large enterprises where the application needs to be accessed from several locations. In another embodiment, a non-interactive Web-service interface is provided to support interactions with third-party applications and systems.

Figure 4A:
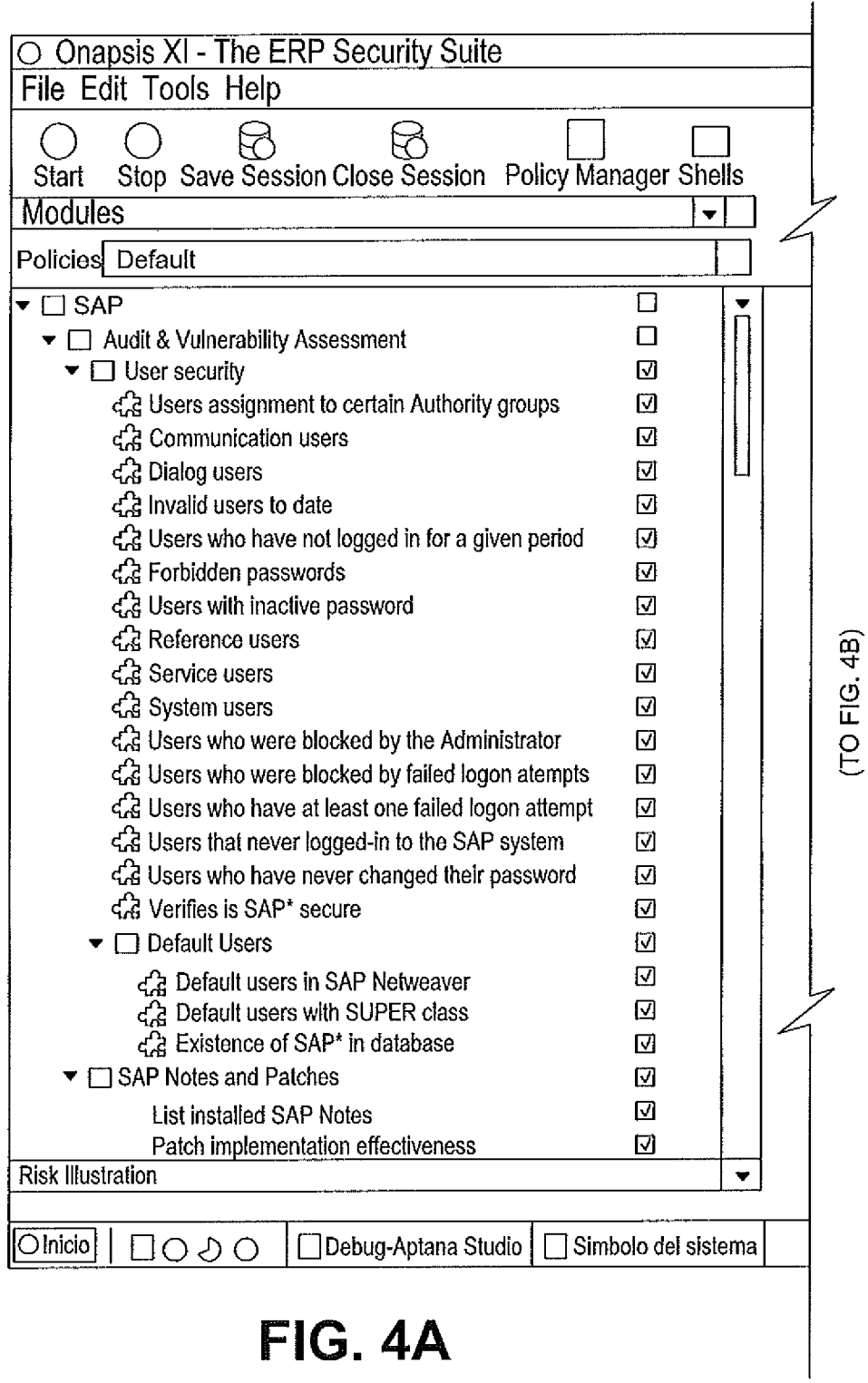
Figure 4B:
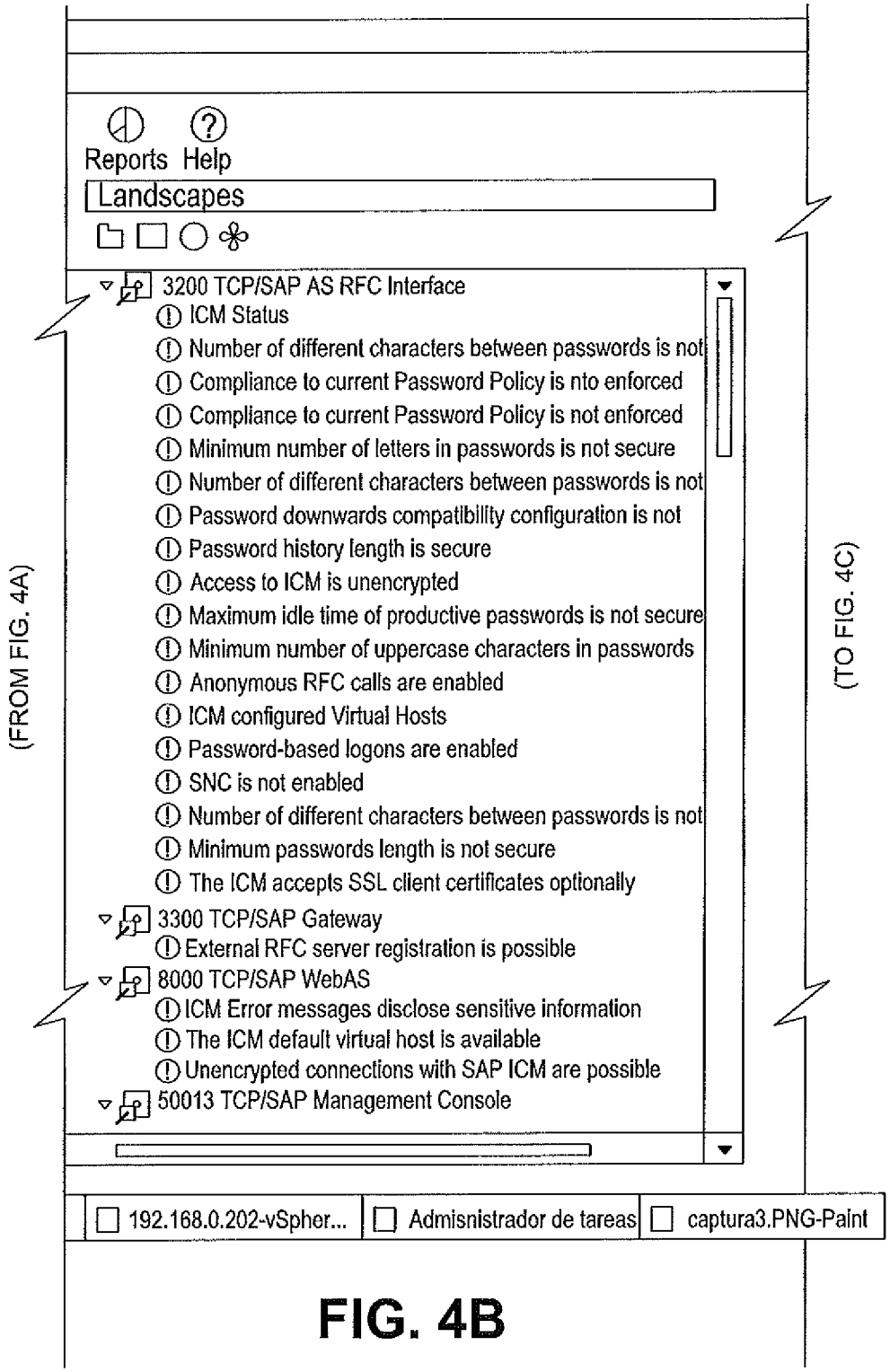

If the user is using an interactive UI, the application will output session results through the Session Manager [05] sub-component. This sub-component outputs information about the session when sub-component is started. Information from the session that are output can include detected security risks in each component of the evaluated landscapes, module execution status, session execution time, module messages, core engine messages, warnings and debug messages. FIGS. 4A, 4B, and 4C illustrate sample screenshots showing information from one such session.

After the session has been completed, the user can access the Report Manager [07] sub-component. This user interface sub-component interacts with the Report Generator [13] to obtain the content of reports which may be generated. Here the user is presented with different types of reports. The user can choose different reports for viewing or the user can save the reports to an external file in the local file-system. Supported file formats include PDF, XML, HTML, DOC, XLS, CSV and others.

Core Engine

This component [03] is responsible for several tasks of the application.

The Data Repository [12] sub-component stores information related to vulnerabilities descriptions, module information and SQL queries sets for to each supported database. All the information stored in the repository is localized. Because of this, the application can be made compatible with different languages. In the preferred embodiment, this repository is implemented as a local relational database.

The Configuration Repository [15] sub-component stores the information regarding Landscape Configurations, Policies, Core configuration settings and statistics. This information is retrieved and saved by other components of the application. In the preferred embodiment, this repository is implemented as a local relational database.

The Report Generator [13] sub-component deals with the generation of session reports after a session has been completed. This sub-component obtains the required information from the Knowledge Base [14]. This sub-component generates an XML string, or a string in other open or proprietary formats, which contains all the information of the session. The string can be interpreted by other components of the application or third-party applications.

Scan Engine

The System Identifier [09] is a sub-component which automatically discovers, identifies and organizes business-critical systems present in a computer network. The involved procedure begins when the sub-component is provided with a base Landscape name, a set of IP address and/or hostnames (targets), a set of ports to scan (ports to scan) and discovery options. IP addresses can be specified individually or in ranges. Discovery options include: whether the targets must be checked for activity, whether detected open ports must be fingerprinted to identify underlying services with lower false-positive rates, whether an attempt should be made to automatically identify and organize systems, as well as other options.

For each provided target, the sub-component will:

1. Try to detect if the target system is active, if the related discovery option is enabled. This is implemented by sending ICMP requests and/or TCP packets to specific ports on the target system, these specific ports being those commonly used by supported business-critical applications.

2. Perform a TCP and UDP port-scan over the target system, to each port specified in ports to scan, reporting open, closed and filtered ports.

3. If the related option is enabled, send all the probes located in the Fingerprint Database [11] to each detected open port and analyse the generated responses. If the received responses match expected responses, the service is successfully identified. Otherwise, the service is marked as "unidentified". Each service marked as "identified" is checked to see if any of the application connectors is associated with it. If an application connector is associated with it, a new connector for that service on that target system is created.

4. If the option to identify and organize systems automatically is enabled, a special procedure described below is executed.

Given a list of connectors, the identification process consists of the following steps:

Every connector belongs to a specific component. If the component of the current connector does not already exist, it is created. Otherwise, the connector is added to the existing component.

Every connector, having a deep knowledge of the service it connects to, tries to identify the System Name of the component it belongs to. This is performed by sending service-specific probes to the target system. If the connector can successfully detect the System Name, then the identification process adds the component to the respective system.

If the connector cannot detect the System Name, then certain rules are applied:

If the connector's component already exists and another connector belonging to the same component was able to detect the name of the system, then that name is configured in the system.

If there is a "sibling" component (a component belonging to the same system), then the System Name is obtained from that component.

If the connector cannot obtain the name of the system, it may implement a method that tries to check for a specific system name. After all possible System Names are identified, the process will perform a check on every unidentified connector to verify if it can detect if the provided System Name is valid.

This component returns a tree structure as the one depicted in FIG. 3 for each landscape that was provided. Once the available ports and IP addresses are known, the various modules for assessing the target system's configuration, parameters, and settings can then be launched.

The Fingerprint Database [11] sub-component is responsible for storing a set of probes (network requests) for each supported connector, as well as the expected response (represented through regular expressions or equivalent mechanism) for each probe. This repository is used mainly by the System Identifier [09] sub-component to analyse detected open ports for known services.

One of the problems that arises when evaluating the security of an SAP system in a black box mode is the scope of the checks: some of the checks affect the entire system, some checks are only applied at the component-level, while others are applied at the connector-level. Without considering this kind of design consideration, launching every module against every compatible connector would result in the generation of redundant information and longer assessment times.

In order to solve this issue, the present invention implements the Module Intelligent Dispatcher [10], which takes into account the scope of modules (defined in each module) and launches them according to the following procedure:

If the scope of the module is SYSTEM, then the dispatcher tries to run the module on all the compatible connectors of the target system, until it is successfully executed. This means the module is successfully executed only once per system of the landscape.

If the scope of the module is COMPONENT, then the dispatcher tries to run the module on all the compatible connectors of the target component, until it is successfully executed. This means the module is successfully executed only once per component of the system.

If the scope of the module is CONNECTOR, then the dispatcher runs the module on all the compatible connectors. This means the module is executed only once per connector.

Following this procedure, the present invention can ensure that every landscape/system/component/connector is properly evaluated and avoids the generation of redundant information.

The Knowledge Base [14] sub-component works as a repository for storing all the information generated during a scan session. This information is composed of the evaluated targets, module Policies used, module execution status, and generated results. This information comprises the base data for report generation and has another important use: it allows for the sharing of data between modules during the session. Every result that a module generates is stored in the Knowledge Base [14] under a specific key. Therefore, any module under execution can choose to request information from the Knowledge Base [14] by providing the respective key. This enables the development of cohesive modules and mimics some of the manual techniques, where information obtained through some access points could be useful for other points.

Modules

Figure 2:
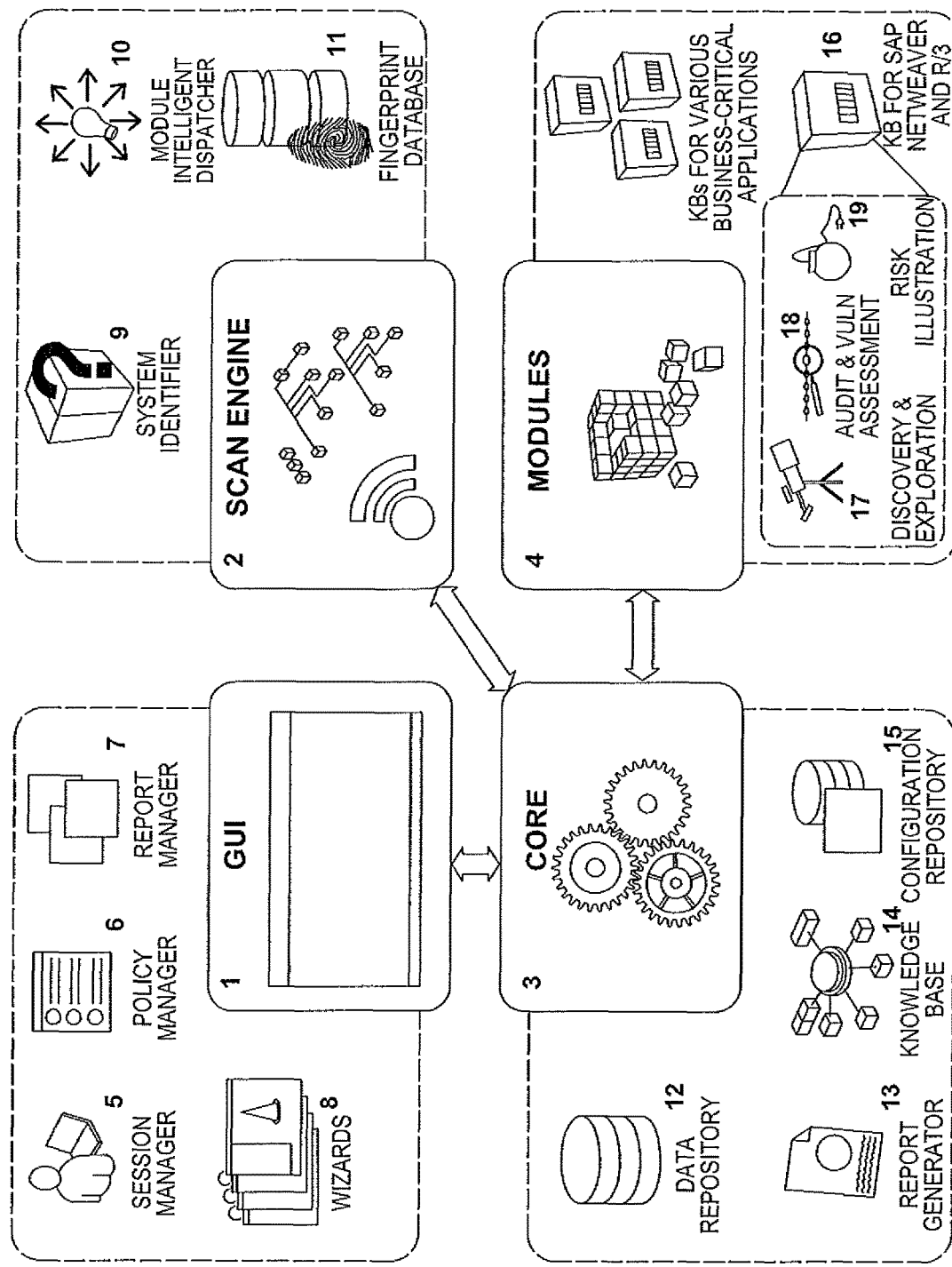
FIG. 2 is a block diagram illustrating possible components of a system according to one aspect of the invention.

Modules [04] are the components which perform a specific action or function over the target systems. As shown in FIG. 2, modules can belong to one of 3 categories: Discovery & Exploration, Audit & Vulnerability Assessment, or Risk Illustration. Each module also belongs to a specific Knowledge Pack (which groups modules compatible with the same kind of business-critical Application). Examples of Knowledge Packs are: Knowledge Pack for SAP NetWeaver and R/3, Knowledge Pack for Oracle and Knowledge Pack for Microsoft.

Because business-critical applications are built upon several components, each featuring its own interfaces, protocols and security settings, a set of modules for each component is developed and their description and function can be found below:

Procedures for discovering, auditing, detecting vulnerabilities and illustrating security risks in the RFC Interface of SAP Application Servers Automated Analysis of Whether an External RFC Server is the SAPXPG Program:

This check is performed by connecting with the external RFC server and issuing the RFC_DOCU function call. If functions starting with the name "SAPXPG" are found in the returned output, the server is detected as SAPXPG.

Other procedures involve attempting to execute the SAPXPG_START_XPG or SAPXPG_START_XPG_LONG functions, and checking if execution was successful.

Automated Analysis of Whether it is Possible to Start External RFC Servers through an SAP Gateway Based on the tpnames parameter specified by the user in the module's options, the module connects to the target SAP Gateway and tries to start the RFC server in the specified tphost. The module returns which (if any) tpnames can be started in the specified tphost through the target SAP Gateway.

This module thus implements a method as follows:

a) the module receives at least one program identifier from the user;

b) for each program identifier, the module b1) connects to a gateway for the target system b2) attempts to initiate a specific server associated with the program identifier on a host for the program identified by the program identifier c) determines which programs associated with the program identifiers can be initiated based on the result of step b1) for each program identifier.

Interactively Crafting and Sending of RFC Function Calls to SAP Application Servers This module provides a graphical user interface to create and send RFC calls to an RFC partner, without the need of using an SAP system. After specifying the target system as well as the credentials and the function module to execute, the module connects to the remote party and obtains the required parameters and tables that the function module declares in its interface. The user can then configure each parameter and issue the function call. Results are processed by the module and presented graphically to the user.

Automated Security Analysis of RFC Destinations

The module obtains the RFCDES or equivalent table from an SAP Application Server and analyses its contents reporting security risks associated with the existence of connections with stored credentials, trust relationships and unencrypted interfaces.

Graphical Display of Interfaces for Incoming/Outgoing Connections in SAP Systems The module obtains the RFCDES or equivalent table and the application-level log files from every SAP Application Server and analyses its contents, presenting a graphical representation of the connections between the different SAP systems, and with external systems, so that the user can quickly identify which connections could represent a security risk to the implementation. Information about each connection is presented in the graph.

This module therefore executes a method where the module:

a) retrieves destination tables for remote function calls and other interfaces for application servers associated with the target system b) retrieves log files for applications for the target system c) determines connections between different systems associated with the target system based on the destination tables and log files d) graphically maps the connections e) provides the user with a graphical map of the various connections.

Automated Security Evaluation of the Reginfo File

The module obtains the contents of the reginfo file, either through special RFC function modules or by retrieving the file from the Application Server's file-system, accessing the file configured in the gw/reg info profile parameter.

The file is analysed line-by-line by the module, which reports a security risk if any of the following conditions is met:

The file does not exist.

A line does not have a TP parameter or TP parameter contains an *.

A line does not have a HOST parameter or HOST parameter contains an *.

A line does not have a NO parameter or NO parameter contains an *.

A line does not have an ACCESS parameter or ACCESS parameter contains an *.

A line does not have a CANCEL parameter or CANCEL parameter contains an *.

Any other combination of the defined/possible parameters that could result in a security risk for the application server or system.

Automated Security Evaluation of the Secinfo File

The module obtains the contents of the secinfo file, either through special RFC function modules or by retrieving the file from the Application Server's file-system, accessing the file configured in the gw/sec info profile parameter.

The file is then analysed line-by-line by the module, which reports a security risk if any of the following conditions is met:

The file does not exist.

A line does not have a USER parameter or USER contains an *.

A line does not have a PWD parameter or PWD parameter contains an *.

A line does not have a USER-HOST parameter or USER-HOST parameter contains an *.

A line does not have a HOST parameter or HOST parameter contains an *.

A line does not have a TP parameter or TP parameter contains an *.

Any other combination of the defined/possible parameters that could result in a security risk for the application server or system.

Procedures for discovering, auditing, detecting vulnerabilities and illustrating security risks in the SAProuter component Automated Black-Box Analysis of SAProuter Route Permission Table The user specifies the set of IP ranges and ports to test for. The module tries to connect to each specified IP and port combination through the target SAProuter. The module evaluates the messages generated by the SAProuter. If the SAProuter returns a message describing that the route connection is denied, the connection is marked as impossible. Otherwise, the connection is marked as successful. The module returns the status of all connections performed and performs a risks assessment on them.

For clarity, this module executes a method where the module a) receives IP address ranges and ports from the user b) attempts to connect to each IP address and port combination through a software router associated with the target system with each combination being derived from the IP address ranges and ports from step a)

c) determines that a connection (representing a specific IP address and port combination) is successful if the software router does not deny a connection attempt using that IP address and port combination d) provides the user with a listing of successful and failed connections.

Automated White-Box Analysis of SAProuter Route Permission Table

This module parses the SAProuter Route Permission Table file. This file is a plain-text file consisting of one entry per line. The module analyses each entry and reports a security risk if any of the following conditions is met:

The evaluated entry is P * * * or P * * * *.

The evaluated entry is S * * * or S * * * *.

The evaluated entry is KP * * * or KP * * * *.

The evaluated entry is KS * * * or KS * * * *.

The evaluated entry starts with KT and contains an * in the <src-host> parameter.

The evaluated entry contains an * in the <source-host> parameter.

The evaluated entry contains an * in the <dest-host> parameter.

The evaluated entry contains an * in the <dest-serv> parameter.

The evaluated entry contains an * in the <password> parameter.

The evaluated entry contains a 22 in the <dest-serv> parameter.

The evaluated entry contains a 23 in the <dest-serv> parameter.

The evaluated entry contains an 80 in the <dest-serv> parameter.

The evaluated entry contains a 1503 in the <dest-serv> parameter.

The evaluated entry contains a 5601 in the <dest-serv> parameter.

The evaluated entry contains a 1527 in the <dest-serv> parameter.

The evaluated entry contains a 1433 in the <dest-serv> parameter.

The evaluated entry contains other non-SAP-service in the <dest-serv> parameter.

The evaluated entry starts with a "P", and the <dest-srv> is an SAP application service.

The last entry is not equals to D * * * *

Any other combination of the defined/possible parameters that could result in a security risk for the implementation.

Automated Retrieval of Information from Remote SAProuter

The module creates an info-request network packet and sends it to the target SAProuter. If the connection is accepted, the module returns the information provided by the target.

Automated Black-Box Analysis of the Possibility of Routing Native Protocols through SAProuter For this module, the user specifies the set of IP ranges and ports to test. The module tries to connect to each specified IP and port combination through the target SAProuter, enabling the special flag in the NI packet that specifies that the request is using Native protocols. The module evaluates the messages generated by the SAProuter. If the SAProuter returns a message describing that the route connection is denied, the connection is marked as impossible. Otherwise, the connection is marked as successful. The module returns the status of all connections performed and performs a risks assessment on them.

This module executes the following steps:

a) the module receives IP address ranges and ports from the user b) the module then attempts to connect to each IP address and port combination (from the IP ranges and ports from the user) through a software router associated with the target system. These connections to the software router are performed setting special indicators to notify that they are based on native protocols.

c) the module then determines that a connection (representing a specific IP address and port combination) is successful if the software router does not deny a connection attempt using the specific IP address and port combination d) after attempting all possible IP address and port combination from the listing from step a), the module then provides the user with a listing of successful and failed connections.

Method for Routing Local Network Programs through SAProuters

The module creates a local end-point consisting of a SOCKS proxy or virtual interface and a second component consisting of a SAProuter protocol translator. The user connects to the local end-point using network software. The network traffic is forwarded from the local end-point to the SAProuter protocol translator, which packets it into SAProuter-compatible NI packets and sends them to the target SAProuter. The response is received and the inverse process is carried out. The SAProuter protocol translator unpacks the NI response and forwards it to the local end-point which, in turn, sends it back to the original network software.

The module's function can be expressed as a method where the module:

a) creates an end-point with the end-point having a proxy server and a protocol translator; (The protocol translator translates protocols associated with the target system and its software routers.)

b) receives outgoing network traffic from network software connected to said end-point;

c) forwards outgoing network traffic to protocol translator;

d) at the protocol translator, packages the outgoing network traffic into outgoing packets compatible with the target system's software routers;

e) forwards the outgoing packets to the target system's software routers;

f) receives incoming packets from the software routers;

g) sends the incoming packets to the protocol translator;

h) unpacks the incoming packets into incoming network traffic; and i) forwards the incoming network traffic to the network software.

Automated Analysis of SAProuter Initialization Parameters

The module receives, as input, the command string used to start the SAProuter program. The module reports a security risk if any of the following conditions are met:

The command string does not contain a "–G" argument.
The command string does not contain a "–Y 0" argument.
The command string does not contain a "–Z" argument.
Any other combination of the defined/possible parameters that could result in a security risk for the implementation.

Automated Exploitation of Vulnerabilities in SAPRouter

The module exploits reported vulnerabilities in SAProuter components. Depending on the vulnerability, a special network request is sent by the module to the target system. This allows the user to perform a security sensitive operation over the target system.

Procedures for Discovering, Auditing, Detecting Vulnerabilities and Illustrating Security Risks in the SAP Internet Communication Manager Component Automated Black-Box Analysis of Status of ICM/ICF Services The module is supplied with a database file containing a comprehensive list of existing ICM/ICF services (services listed through transaction SICF). For each service retrieved from the database, the module connects to the target ICM service and sends an HTTP(S) GET/HEAD request for the service URL. The module parses the HTTP(S) response generated by the server and, according to the HTTP status code, reports the status of the service, according to the following criteria:

If the status code is in the 200-299 range, the service is regarded as "accessible".
If the status code is 401, the service is regarded as "user is unauthorized".
If the status code is in the 500-599 range, the service is regarded as "reported error".
If the status code is other, the service is regarded as "no accessible".

This module implements a method described by the following steps:

a) receiving a listing of existing services at a target system
b) for each service listed,
b1) connecting to the service
b2) sending a request using an associated address for the service
b3) receiving a response from the service
c) determining a status of each service listed based on the responses received
d) sending a status of each service to the user.

Automated White-Box Analysis of Status of ICM/ICF Services

The module connects to the target server's database and analyzes the contents of tables ICFAPPLICATION, ICFDOCU, ICFHANDLER, ICFINSTACT, ICFSECPASSWD, ICFSERVICE, ICFSERVLOC, ICFVIRTHOST and others. The module reports the status of the services and their security configuration.

Automated Black-Box Analysis of Usage of HTTPS Protocol

The module tries to connect to the target ICM service and sends an HTTP request for any URL. If the server responds without protocol-level errors, the module reports a security risk as encryption is not enforced in the service.

Automated White-Box Analysis of Usage of HTTPS Protocol

This module connects to the target server and retrieves profile parameters icm/server port 0 to 9 and icm/HTTPS/ verify client or equivalent. If the module determines that the server is not using SSL, a security risk is reported.

Automatic Detection of Information Disclosure in Error Messages

The module sends an HTTP(S) request to the ICM service, which is known to trigger an exception in the server, and parses the server response. If the module detects that the generated response contains information about the SAP system ID and/or other configuration information, a security risk is reported.

Automated Analysis of SSL Configuration Security in ICM Service

The module checks the target ICM service SSL properties. The module reports a security risk if any of the following conditions is met:
 The SSL certificate is expired.
 The SSL certificate is issued to a different name than the server host name.
 The SSL certificate is not signed by a known Certificate Authority.
 The SSL certificate is signed using a weak hash algorithm.
 The SSL service supports weak ciphers.
 The SSL service supports weak protocols (SSLv2).

Automatic Detection of Availability of the SAP ICM Administration Interface

The module reports a security risk if the SAP ICM Administration interface is configured. This is checked by sending an HTTP(S) request to the ICM service, specifying the URL where the ICM Administration Interface is supposed to be configured (defaults to /sap/icm/admin). If the server responds with an HTTP(S) response with a status code different from 404, a security risk is reported. The module can also perform this check by analysing the icm/HTTP/admin_<xx> or equivalent profile parameter. If the parameter is configured with a value different from " " (blank), a security risk is reported.

Automatic Detection of ICM Services with Reported Security Issues

The module connects with the target ICM service and sends an HTTP(S) request for each service located in a special database file. The database file contains service URLs for each service which has a reported security vulnerability in an SAP Note or equivalent. If the server response contains a response code different from 404, a security risk is reported.

Automated Exploitation of Vulnerabilities in ICM Services

The module exploits reported vulnerabilities in ICF services, BSP applications and ABAP WebDynpro applications. Depending on the vulnerability, a special HTTP(S) request is sent by the module, which allows the user to perform a security sensitive operation over the target ICM service.

Procedures for Discovering, Auditing, Detecting Vulnerabilities and Illustrating Security Risks in the SAP Enterprise Portal and J2EE Engine Components Automated Black-Box Analysis of Status of Java applications The module is supplied with a database file containing a comprehensive list of existing Java Applications (applications listed through the WebDynpro Console or Content Administration of the J2EE Engine). For each application retrieved from the database, the module connects to the target service and sends an HTTP(S) GET/HEAD request for the application's URL. The module parses the HTTP(S) response generated by the server and, according to the HTTP status code and body, reports the status of the application, according to the following criteria:
 If the status code is 200 and the body does not contain the string "Internal Server Error" or a redirection directive, the application is regarded as "accessible".
 If the status code is 200 and the body contains the string "Internal Server Error" or a redirection directive, the application is regarded as "not accessible".
 If the status code is not 200 and the body contains the string "not deployed", the application is regarded as "not deployed".

Automated Analysis of Whether User Self-Registration is Enabled

The module connects to the target SAP J2EE Engine and sends a request for the /webdynpro/dispatcher/sap.com/tc~sec~ume~wd~enduser/SelfregApp and/or the /useradmin/selfReg URLs or equivalent. If no error is detected in server response, a security risk is reported.

Automated Analysis of Whether SAP Knowledge Management can be Accessed Anonymously The module connects to the target SAP Enterprise Portal service and sends an HTTP request to the SAP Knowledge Management component, without specifying access credentials. If no error is generated by the server, the module reports a security risk.

Automated Remote Retrieval of SAP Enterprise Portal Version

The module connects to the target SAP J2EE Engine and sends a request for the /irj/portal URL or equivalent. The server response is parsed and the string after the PortalVersion string in the HTML content is retrieved and reported.

Automated Black-Box Analysis of Usage of HTTPS Protocol

The module tries to connect to the target J2EE Engine service and sends an HTTP request for any URL. If the server responds without errors, the module reports a security risk as encryption is not enforced in the service.

Automated Analysis of SSL Configuration Security in J2EE Engine Service

The module checks the target J2EE Engine service SSL properties. The module reports a security risk if any of the following conditions is met:
 The SSL certificate is expired.
 The SSL certificate is issued to a different name than the server host name.
 The SSL certificate is not signed by a known Certificate Authority.
 The SSL certificate is signed using a weak hash algorithm.
 The SSL service supports weak ciphers.
 The SSL service supports weak protocols (SSLv2).

Automated Black-Box Discovery and Analysis of the Global Services via SAP Knowledge Manager The module connects to the target SAP Enterprise Portal and sends a HTTP request to /irj/go/km/navigation/runtime/ or equivalent. If the server responds with a list of Global Services, the module reports them in an information message.

Automated Remote Creation of a User in SAP Enterprise Portal

If the user self-registration procedure is enabled in the target service, the module sends a specially-crafted HTTP request message to create a user in the remote system.

Automated Remote Retrieval of SAP Enterprise Portal Installation Path

The module connects to the target SAP Enterprise Portal and sends a request for the /irj/servlet/prt/soap URL or equivalent with a random file name (i.e. /irj/servlet/prt/soap/

<random_value>.wsdl). The server response is parsed and the Installation path is retrieved and reported.

Automated Internal Port-Scan Using the J2EE Engine Web Services Navigator

The module first detects if the Web Services Navigator application is enabled in the target. If it is, it sends specially crafted HTTP GET and POST requests to this service, based on a set of IP ranges and ports defined by the user, in order to force the Web Services Navigator to connect to these systems and services. The server response is parsed in order to analyse connection results and the outcome is reported to the user.

Automated Email Sending through SAP Enterprise Portal

The module tries to use the SAP Enterprise Portal component SAP Collaboration. The module sends specially crafted HTTP POST and GET requests in order to send specific email to users of the SAP Enterprise Portal who have their email addresses properly configured.

Automated Remote Retrieval of SAP Portal Technical Information and Automated Security Analysis The module connects to the target SAP Enterprise Portal and downloads a file containing the SAP J2EE Engine configuration parameters. This file is opened by the module and each configuration parameter is analysed in order to detect security risks. Shall a security risk be detected, the module reports it to the user.

Automated Exploitation of Vulnerabilities in SAP Enterprise Portal and J2EE Engine Components The module exploits reported vulnerabilities in SAP Enterprise Portal and J2EE Engine components. Depending on the vulnerability, a special network request is sent by the module, which allows the user to perform a security sensitive operation over the target system.

Procedures for Discovering, Auditing, Detecting Vulnerabilities and Illustrating Security Risks in the SAP Management Console Component Automated Remote Retrieval of SAP Management Console Administration Methods The module connects with the target SAP Management Console service and sends an HTTP request for an URL ending in "?wsdl" or equivalent. Upon processing this request, the target server responds with a WSDL file, which is processed by the module. The module analyses which SOAP methods are implemented in the target server and reports associated security risks to the user.

Automated Execution of Administration Methods from a Non-SAP Application

The module provides an interface to execute the existing SOAP methods, either with or without authentication credentials. Through the execution of those methods, the following activities can be performed over the target service:

Verify if the SAPMC is password protected, get the environment information of the server, obtain the host instance information, retrieve the profile parameters of an SAP instance, get the SAP start profile contents, get the SAP trace file, get version information from the SAP server, list the developer traces, list the log files, retrieve a specific log file, retrieve a specific developer trace, shutdown an SAP instance anonymously, shutdown the SAPMC service anonymously, read the ABAP system log, execute operating system commands and others. The module analyses the generated response after each SOAP method is executed and the results of the analysis presented to the user. If security risks are detected, they are reported by the module.

Automated Exploitation of Vulnerabilities in SAP Management Console Components

The module exploits reported vulnerabilities in SAP Management Console components. Depending on the vulnerability, a special network request is sent by the module, which allows the user to perform a security sensitive operation over the target system.

Procedures for Discovering, Auditing, Detecting Vulnerabilities and Illustrating Security Risks in the SAP Message Server Component Automated Retrieval of SAP Profile Parameters The module connects to the HTTP Administration port of the target SAP Message Server and sends an HTTP request to the /msgserver/text/parameter URL or equivalent, specifying a profile parameter name provided by the user as a request parameter. The module can also be provided with a database file containing the names of all possible profile parameters. The module then sends an HTTP request to each possible parameter and thereby obtains all profile parameters from the target SAP application server. The configuration for each obtained parameter is then analysed for security risks and, if any risk is detected, the module reports it to the user.

Procedures for Detecting Modifications to SAP ABAP Developments in an SAP System Automatic Security Snapshots of SAP ABAP Developments The module connects to the database server of the target SAP system and accesses the database instance/schema used to store the SAP system's information.

The module calculates a signature (implemented through CRC, Hash algorithm or equivalent) of all or some of the following information:

Table field "DATA" of table REPOSRC.
Table field "LDATA" of table REPOLOAD.
Table field "QDATA" of table REPOLOAD.
Table field "LOGICINFO" of table DYNPSOURCE.
Table field "CLUSTD" of table O2PAGCON.
Any field(s) on any other table(s) that contains information whose integrity needs to be checked.

The retrieved signatures are stored in a local repository. This repository can be implemented as a local relational database.

This module executes the above method with the following steps:

a) connecting to a specific database of the target system
b) accessing the database and retrieving specific entries from specific fields from the database
c) calculating a signature value from the specific entries
d) storing the signature value in a repository remote from the target system (in one implementation, a local repository is used)
f) if multiple signature values exist for the target system, each signature value is stored separately.

Automatic Comparison of Security Snapshots of SAP ABAP Developments

After two snapshots (A and B) of SAP ABAP developments have been performed by the module described above, it is possible to perform an automatic comparison of them.

The module will compare the stored signatures in both snapshots and report the following information:

Signature for item X is different in the compared snapshots.
Item X does not exist in snapshot B, but it exists in snapshot A.
Item X does not exist in snapshot A, but it exists in snapshot B.

This module thus extends the capabilities of the previous module by executing the following steps (and building on the above method):

g) steps a)-f) are executed at least twice at different times h) the signature values obtained at each execution are compared with one another i) the differences between the various signature values are reported to the user.

Procedures for Discovering, Auditing, Detecting Vulnerabilities and Illustrating Security Risks in Operating System and Databases through SAP Application-Level Protocols Automated Analysis of Security Permissions and Integrity of SAP Executable and Configuration Files through SAP Application-Level Protocols The module connects to the SAP system using the SAP RFC or HTTP interface, or other SAP application-level protocol independent from the underlying Operating System. Once logged in the target system, the module executes a special function to verify whether the files belonging to the SAP Application Server have the security permissions properly defined and reports associated security risks to the user. This module also verifies whether the analyzed files have been modified, calculating a security signature for them, comparing it with a known signature and reporting differences to the user.

This module executes a method where the module performs the following steps:

a) connects to the target system b) executes a special function to verify if files associated with a specific application server have properly defined security permissions c) reports to the user the results of the verification executed in step b).

For the above method, step a) is executed independently of the underlying operating system of the target system.

Automated Analysis of Security of SAP Users and Groups

The module connects to the SAP system using the SAP RFC or HTTP interface, or other SAP application-level protocol independent from the underlying Operating System. Once logged in the target system, the module executes a special function to verify whether the existing SAP user groups are only containing the required users. The module reports associated security risks to the user.

Procedures for Discovering, Auditing, Detecting Vulnerabilities and Illustrating Security Risks in SAP GUI Installations Automated Analysis of SAP GUI Version The module connects to the target Operating System using native interfaces or administration network services. The module obtains the SAP GUI version from the Microsoft Windows Registry. The module compares this version with the latest available version. If the installed version is older than the latest available one, a security risk is reported to the user.

Automated Analysis of SAP GUI Security Settings

The module connects to the target Operating System using native interfaces or administration network services. The module obtains the configuration of the SAP GUI Security Module and other relevant security settings from the Microsoft Windows Registry, such as the configuration of kill-bits for vulnerable or dangerous SAP GUI ActiveX, SAP GUI Scripting options and SAP GUI input history configuration. The module compares the detected settings with the best-practice configuration. If these do not match, a security risk is reported to the user.

The module therefore executes a method having the following steps:

a) connecting to the operating system of the target system;

b) retrieving configuration and security settings for specific modules and components of the operating system;

c) comparing the configuration and security settings with specific configuration and settings which are considered safe (these settings and configurations can change over time as industry-defined best practices change);

d) if the safe/best practices configuration and settings do not match the configuration and settings retrieved in step b), a security risk is reported to the user.

Procedures for Expanding Compromise Over Vulnerable SAP Installations

Method for Automating Penetration Testing through SAP ABAP/Java Agents

After an SAP system has been compromised through an exploit module, it becomes highly interesting to analyze whether an attacker would be able to expand his influence over other systems in the target network.

In order to do so, it is necessary to be able to perform several assessment activities through the compromised system. With that objective, the current invention comprises an ABAP/Java application that is deployed to the compromised SAP system. This application receives instructions from the user. The application provides the following features:

Ability to read and write files in the local operating system

Ability to execute arbitrary operating system commands in the local operating system Ability to open and close networks connections to remote systems Ability to proxy network traffic to specified systems This module's function can therefore be seen as executing a method with the following steps:

a) receiving configuration instructions from the user;

b) attempting to execute multiple operating system commands on the operating system of the target system;

c) attempting to open and close network connections between the target system and other remote systems;

d) attempting to provide proxy services to network traffic between the target system and specific networked systems.

Of course, the module is launched from within the target system and the steps are executed within the operating system of the target system.

It should be noted that while the above detailed examples use SAP applications, servers, services, and systems, the methods and concepts disclosed above may be used on other systems as well. Other business-critical systems may also be analyzed, probed, and assessed according to the above described methods and systems.

The method steps of the invention may be embodied in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

The embodiments of the invention may be executed by a computer processor or similar device programmed in the manner of method steps, or may be executed by an electronic system which is provided with means for executing these steps. Similarly, an electronic memory means such computer diskettes, CD-Roms, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g. "C") or an object oriented language (e.g. "C++"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

Having thus described the invention, what is claimed as new and secured by Letters Patent is:

1. A system for automatically assessing the security of a computer running one or more software applications in a network in communication with a first server configured to execute a user interface and a core engine to receive a requested assessment of the computer, comprising:
   a second server in communication via the network with the first server comprising a processor and memory configured to store non-transitory instructions, which when executed by the processor is configured to perform the steps of:
   executing a scan engine comprising;
      a system identifier subcomponent for determining resources of the computer;
      a fingerprint database storing a set of probes and a corresponding expected response for each probe;
      a plurality of testing and probing modules for automatically testing the resources of the computer and for determining a vulnerability of said resources of the computer; and
      an intelligent dispatch subcomponent for launching at least one of said plurality of testing and probing modules based on a configuration of said module;
   receiving instructions from the core engine regarding an activity to perform in the computer;
   receiving from the core engine a port identifier specifying a port of the computer;
   creating an application connector for a known service on the specified port;
   using the application connector, probing the specified port with a probe from the fingerprint database to determine that the known service is open;
   launching, by the intelligent dispatch subcomponent, a module of the plurality of testing and probing modules on the second server targeting the known service via the specified port of the computer;
   receiving a result from the launched module indicating a vulnerability of the computer; and
   sending the result to the core engine for presenting the result with the user interface.

2. The system of claim 1, wherein the first server is a local server on the network and the second server comprises a cloud based server.

3. The system of claim 1, wherein the first server is a cloud based server and the second server comprises a local server on the network.

4. The system of claim 1, wherein the software application comprises one or more of a group consisting of Customer Relationship Management (CRM), Supplier Relationship Management (SRM), Supply Chain Management (SCM), Product Life-cycle Management (PLM), Human Capital Management (HCM), Integration Platforms, Business Warehouse (BW), Business Intelligence (BI), and enterprise resource planning (ERP).

5. The system of claim 1, wherein the software application comprises one or more of a group consisting of SAP software, Oracle software, Microsoft software, Siebel software, JD Edwards software, and PeopleSoft software.

6. A system for automatically assessing the security of a computer running one or more software applications in a network in communication with a first server configured to execute a user interface and a core engine to receive a requested assessment of the computer, comprising:
   a second server comprising a processor and memory configured to store non-transitory instructions, which when executed by the processor is configured to perform the steps of:
   executing a scan engine comprising;
      a system identifier subcomponent for determining resources of the computer;
      a fingerprint database storing a set of probes and a corresponding expected response for each probe;
      a plurality of testing and probing modules for automatically testing resources of the computer and for determining a vulnerability of said resources; and
      an intelligent dispatch subcomponent for launching at least one of said testing and probing modules based on a configuration of said module;
   receiving instructions from the core engine regarding an activity to perform in the computer;
   creating an application connector for a known service on a specified port of the computer;
   using the application connector, probing the specified port with a probe from the fingerprint database to determine that the known service is open;
   launching, by the intelligent dispatch subcomponent, a module on the second server targeting the computer;

receiving a result from the launched module indicating a vulnerability of the computer; and sending the result to the core engine for presenting the result with the user interface, wherein the first server and the second server are partitioned on the same server.

7. The system of claim 6, wherein the software application comprises one or more of a group consisting of Customer Relationship Management (CRM), Supplier Relationship Management (SRM), Supply Chain Management (SCM), Product Life-cycle Management (PLM), Human Capital Management (HCM), Integration Platforms, Business Warehouse (BW), Business Intelligence (BI), and enterprise resource planning (ERP).

8. The system of claim 6, wherein the software application comprises one or more of a group consisting of SAP software, Oracle software, Microsoft software, Siebel software, JD Edwards software, and PeopleSoft software.

* * * * *